United States Patent [19]

Noda et al.

[11] Patent Number: 5,554,458
[45] Date of Patent: Sep. 10, 1996

[54] ALUMINUM NON-AQUEOUS ELECTROLYTE SECONDARY CELL

[75] Inventors: Kazuhiro Noda; Eishi Endo; Kenichi Takahashi, all of Kanagawa, Japan

[73] Assignee: Sony Corporation, Tokyo, Japan

[21] Appl. No.: 409,033

[22] Filed: Mar. 23, 1995

[30] Foreign Application Priority Data

Mar. 28, 1994 [JP] Japan .................................. 6-082382

[51] Int. Cl.⁶ .................................................. H01M 10/40
[52] U.S. Cl. .......................... 429/194; 429/198; 429/199; 429/203; 429/221; 429/218
[58] Field of Search .................................. 429/194, 198, 429/199, 203, 221, 218

[56] References Cited

U.S. PATENT DOCUMENTS 4,463,072  7/1984  Gifford et al. ........................... 429/194
4,882,244  11/1989  Donahue et al. ........................ 429/194
5,188,914  2/1993  Blomgren et al. ...................... 429/198

Primary Examiner—Prince Willis, Jr.
Assistant Examiner—Carol Chaney
Attorney, Agent, or Firm—Hill, Steadman & Simpson

[57] ABSTRACT

An aluminum non-aqueous electrolyte secondary cell having excellent rechargeable characteristics and comprising an aluminum or an aluminum alloy negative electrode, characterized in that it comprises a negative electrode made from aluminum or an aluminum alloy, a non-aqueous electrolyte containing a non-aqueous solvent with an aluminum halide and an organic halide dissolved therein, and a positive electrode containing $FeS_2$ as the active material.

2 Claims, 3 Drawing Sheets

ALUMINUM NON-AQUEOUS ELECTROLYTE SECONDARY CELL

BACKGROUND OF THE INVENTION

1. Field of the Invention

The present invention relates to an aluminum non-aqueous electrolyte secondary cell comprising an aluminum or an aluminum alloy negative electrode.

2. Description of the Related Art

In theory, aluminum yields an energy density per unit volume of 8,050 Ah/l. This value is about 4 times as large as that of lithium. Thus, a rechargeable cell of high energy density can be implemented at a low cost by using aluminum or an aluminum alloy for the negative electrode of the cell. Cells having an aluminum or an aluminum alloy negative electrode are therefore believed promising, and the development thereof is under way. An aluminum electrode yields a standard electrode potential of −1.66 V with respect to the standard hydrogen electrode. Thus, a secondary cell compatible with the conventional cells operating at an ordinary temperature, for instance, alkaline dry cells, silver oxide cells, nickel-cadmium batteries, nickel-hydrogen batteries, etc., are expected by using an aluminum negative electrode in combination with an appropriate positive electrode material. A secondary cell, particularly a secondary cell operating at room temperature, using an aluminum or an aluminum alloy negative electrode is therefore of great promise.

As compared with hydrogen, thermodynamics teaches that aluminum is by far stable against reduction. Accordingly, in case an aluminum electrode is employed, it is extremely difficult to implement an aluminum secondary cell using an electrolyte based on an aqueous solution. Furthermore, a stubborn and dense passive film is appeared on the surface of aluminum due to a strong affinity of aluminum with oxygen atoms. It can be readily understood that this leads to the formation of a large polarity, and to a further growth of a passive film on the negative electrode during discharge.

The development of a non-aqueous electrolyte is the key for developing a secondary cell which functions at room temperature using aluminum or an aluminum alloy as the negative electrode. It is also important to develop an activating material of the positive electrode suitable for the non-aqueous electrolyte.

The use of, for example, a non-aqueous electrolyte for lithium batteries based on an organic solvent, or such based on an ether or a high temperature molten salt has been proposed to the present for use as the non-aqueous electrolyte of secondary cell equipped with an aluminum or an aluminum alloy negative electrode. More recently, the use of a non-aqueous electrolyte based on a molten salt for ordinary temperature use comprising an aluminum halide/N-alkylpyridinium halide or an aluminum halide/N-alkylimidazolium halide is also proposed.

However, the non-aqueous electrolytes proposed to the present are disadvantageous in that they yield a conductivity lower than the conventional aqueous electrolytes by a digit or two. More specifically, for instance, in case the cell is built from a non-aqueous electrolyte based on an organic solvent for use in lithium cells and the like, the resulting cell suffers inferior drain capability due to the low conductivity of the electrolyte.

In case of a non-aqueous electrolyte based on ethers, moreover, not only the problems concerning conductivity, but also the inflammable nature of ether must be taken into account. More specifically, ether electrolytes must be handled with great care. In case of a non-aqueous electrolyte based on a high temperature molten salt, the temperature thereof must be maintained at 200° C. or higher during the operation of the cell. In other words, the cell based on a high temperature molten salt does not function at room temperature. Considering a non-aqueous electrolyte based on a low temperature molten salt, there are many disadvantages concerning the stability of the molten salt. More specifically, molten salts not only are viscous, but also have a very limited temperature range of operation. If once the salt is brought at a temperature out of the limited range, the electrolyte readily undergoes solidification, or the construction or the concentration of the complex ions constituting the electrolyte change from the initial state.

Because no non-aqueous electrolyte particularly suitable for the aluminum non-aqueous electrolyte secondary cell is found to present, there is no concrete proposal for the material suitable for use as the positive electrode material.

In the light of the aforementioned circumstances, the present invention aims to overcome the problems of the prior art technology. Thus, an object of the present invention is to develop a non-aqueous electrolyte and a positive electrode material which enable reversible deposition and dissolution of aluminum at a high current density. It is also an object of the present invention to provide, by employing the non-aqueous electrolyte and the active material thus obtained, an aluminum non-aqueous electrolyte secondary cell with an aluminum or aluminum alloy negative electrode.

SUMMARY OF THE INVENTION

Accordingly, the present inventors have found that the aforementioned object of the present invention can be achieved by a secondary cell comprising an aluminum or an aluminum alloy negative electrode, a non-aqueous electrolyte, and a positive electrode, provided that the non-aqueous electrolyte comprises a non-aqueous solvent, an aluminum halide, and an organic halide such as a quaternary ammonium salt or a quaternary phosphonium salt, e.g., an N-alkyl pyridinium salt, and that $FeS_2$ is used as the positive electrode material. The present invention has been accomplished based on those findings.

More specifically, the present invention provides an aluminum non-aqueous electrolyte secondary cell equipped with an aluminum or an aluminum alloy negative electrode, a non-aqueous electrolyte, and a positive electrode, provided that the non-aqueous electrolyte comprises a non-aqueous solvent, an aluminum halide, and an organic halide, and that $FeS_2$ is used as the positive electrode activating material.

DESCRIPTION OF THE PREFERRED EMBODIMENTS

Figure 1:
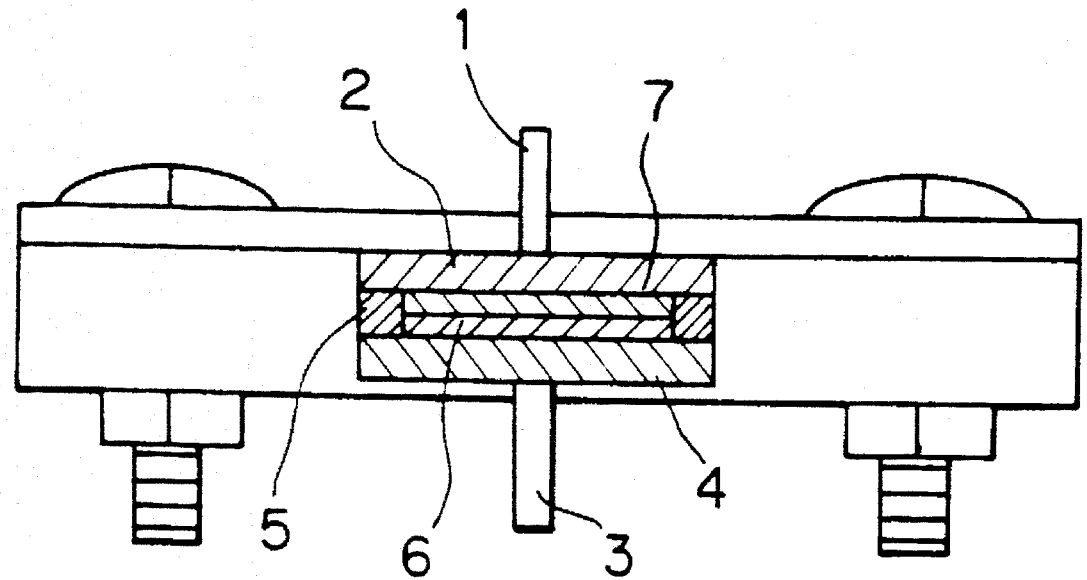
FIG. 1 is a cross sectional view of an aluminum non-aqueous electrolyte secondary cell fabricated according to an embodiment of the present invention.

The present invention is described in further detail below referring to the preferred embodiment according to the present invention. It should be understood, however, that the present invention is not to be construed as being limited thereto.

The non-aqueous electrolyte for use in the present invention comprises a non-aqueous solvent in which an aluminum halide and an organic halide are added.

Preferably, the aluminum halide for use in the present invention is an anhydrous compound expressed by a general formula of $AlX_3$ (where X represents an element selected from the group consisting of Cl, Br, and I). The aluminum halide is preferably incorporated in the non-aqueous electrolyte at a concentration in a range of from 0.1 to 10 mol/l, and more preferably, in a range of from 6.0 to 7.5 mol/l If the concentration of the aluminum halide should be too low, the charge efficiency of the cell decreases. However, aluminum halide that is present in an excessively high concentration would not dissolve.

The organic halide to be added in the non-aqueous electrolyte is a compound capable of supplying an anion, e.g., a halogen ion, to the aluminum halide. Preferred organic halides include a quaternary ammonium salt and a quaternary phosphonium salt. Particularly preferred organic halides are the anhydrous compounds expressed by the general formula (I) or (II) below:

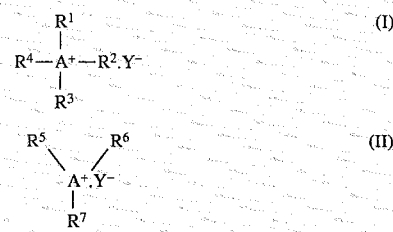

In the general formulae (I) and (II) above, A represents a nitrogen atom or a phosphorus atom. $R^1$, $R^2$, $R^3$, $R^4$, $R^5$, $R^6$, and $R^7$ each independently represent a hydrocarbon group, and preferably, a hydrocarbon group having 10 or less carbon atoms. More specifically, $R^1$, $R^2$, $R^3$, $R^4$, $R^5$, and $R^6$ each represent, for example, an alkyl group such as a methyl group, an ethyl group, or a propyl group; an aryl group such as a phenyl group; or an aralkyl group such as a benzyl group. $R^7$ represents, for example, an alkylidene group such as a methylene group, an ethylidene group, or a propylidene group. Furthermore, $R^1$ may be combined with $R^2$ to form a ring, or $R^5$ may be combined with $R^7$ to form a ring. In case of a nitrogen atom, for instance, $R^1$ may be combined with $R^2$ to form a pyrrolidine ring or a piperidine ring; $R^5$ may be combined with $R^7$ to form a pyridine ring or an imidazole ring. The hydrocarbon groups enumerated above may have various types of substituent groups such as a trifluoromethyl group. The groups represented by $R^1$, $R^2$, $R^3$, $R^4$, $R^5$, and $R^6$ above may be the same or may be differed from each other. The counter anion represented by $Y^-$ are the halogen ions such as $Cl^-$, $Br^-$, or $I^-$.

Specifically mentioned as the quaternary ammonium salt are, for example, tetramethylammonium chloride, trimethylethylammonium chloride, trimethylphenylammonium chloride, trimethylbenzylammonium chloride, tetraethylammonium chloride, triethylmethylammonium chloride, triethylphenylammonium chloride, triethylbenzylammonium chloride, N,N-dimethylpyrrolidinium chloride, N-n-butylpyridinium chloride, and 1-ethyl-3-methylimdazolium chloride.

Specific examples of the quaternary phosphonium salt include tetra-n-butylphenylphosphonium chloride, tetraethylphosphonium chloride, triphenylethylphosphonium chloride, and trimethylbenzylphosphonium chloride.

The organic halide and the aluminum halide are added at a ratio by molar of the former to the latter of, preferably, from 0.2 to 1.0, and more preferably, at a ratio of from 0.5 to 0.7.

The concentration of the organic halide with respect to that of the aluminum halide is confined to a limited range above because of the reason as follows.

In a non-aqueous electrolyte, aluminum halides function as Lewis acids, and organic halides function as Lewis bases. Thus, neutral ions $AlY_4^-$ principally generate in case organic halides are present in excess with respect to aluminum halides, whereas acidic ions $Al_2Y_7^-$ are mainly formed in case aluminum halides are present in an amount larger than organic halides. The $Al_2Y_7^-$ ions are electrochemically more active than $AlY_4^-$ because the $Al_2Y_7^-$ ions suffer structural strains. Thus, aluminum ions can be readily obtained therefrom by electrodeposition. Accordingly, the electrodeposition of aluminum can be favorably carried out by setting the concentration of aluminum halides higher than that of organic halides. For instance, in case a non-aqueous electrolyte is prepared by dissolving $AlCl_3$ and trimethylbenzylammonium chloride (TMBAC) as electrolytes into a non-aqueous solvent 1,2-dichlorobenzene, a low electrodeposition efficiency is obtained for aluminum when the ratio by molar of the organic halide to the aluminum halide ($TMBAC/AlCl_3$) is set higher than 1.0. In such a case, the solution is basic, and $AlCl_4^-$ ions are predominant in the solution. On the contrary, an acidic electrolytic solution results when the ratio by molar above is lower than 1.0. An acidic solution containing $Al_2Cl_7^-$ ions in high concentration can be obtained. The resulting solution allows a reversible electrodeposition of aluminum.

The non-aqueous solvent in which the organic halide and the aluminum halide are dissolved is preferably an organic solvent subjected to dehydration treatment and having a donor number of 5. The "donor number" is defined as enthalpy generated per mole ($kcal \cdot mol^{-1}$) during the reaction of a donor (solvent) and a standard receptor, i.e., 1,2-dichloroethane containing $1 \times 10^{-3}$ $mol \cdot dm^{-3}$ of antimony pentachloride. The donor number provides a scale for the Lewis basicity of a solvent. The lower the number, the higher the basicity.

Organic solvents having a donor number of 5 or lower include 1,2-dichloroethane, methylene chloride, benzene, chlorobenzene, 1,2-dichlorobenzene, 1,3-dichlorobenzene, 1,4-dichlorobenzene, fluorobenzene, 1,2-difluorobenzene, 1,3-difluorobenzene, 1,4-difluorobenze, and a mixture containing at least two selected therefrom. Particularly preferred among them are 1,2-dichloroethane, 1,2-dichlorobenzene, and 1,3-dichlorobenzene.

The behavior of the aluminum halide in an organic solvent having a donor number of 5 or lower is described below.

In case halogen X which constitutes the aluminum halide is the same as that of halogen Y which constitutes the organic halide expressed by either formula (I) or formula (II), the resulting non-aqueous electrolyte contains $AlY_4^-$ and $Al_2Y_7^-$ ions as the principal complex ions containing aluminum. An $AlY_4^-$ ion is electrochemically stable because it has a tetrahedral structure, i.e., a structure with a higher degree of symmetry. If one aims to obtain aluminum as deposits by reducing $AlY_4^-$ ions, the efficiency of electrodeposition would result low because reactions other than the reduction of aluminum occurs preferentially.

As described in the foregoing, in contrast to the electrochemically stable $AlY_4^-$ ions, $Al_2Y_7^-$ ions are electrochemically less stable due to the stressed structure. Accordingly, aluminum can be relatively easily obtained therefrom by electrodeposition.

Thus, to obtain deposition efficiency of aluminum, it is requisite to charge a non-aqueous electrolyte in which $Al_2Y_7^-$ ions predominate over $AlY_4^-$ ions. This requirement can be fulfilled by using a solvent of low basicity, i.e., a solvent having a lower donor number.

Concerning the species of the halogen atoms which constitute the organic halide and that of the aluminum halide, they may be of the same type or of the different type. Preferably, as explained hereinafter, the halogen atoms of the organic halide are differed from those in the aluminum halide. In case $AlBr_3$ is used in combination with TMBAC, it is believed that a complex ion containing both halogen atoms, i.e., $Al_2Br_6Cl^-$, is formed. Aluminum deposits can be obtained smoothly in case complex ions of this type containing mixed halogen atoms are used, because due to their structural stress, the electrochemical reactivity of such ions on an electrode is higher as compared with those of a single halogen atom. Furthermore, the concentration ratio of the organic halide to the aluminum halide can be increased. Conclusively, the halogen atoms constituting the aluminum halide are differed from those of the organic halide.

The activating material for positive electrode is described below.

The present inventors searched for a positive electrode material. As a result, it has been found that sufficiently high charge–discharge characteristics cannot be realized with the positive material such as manganese dioxide commonly used in the art. However, although unexpectedly, it has been found that naturally prevailing $FeS_2$ is particularly superior as a positive electrode material. It is also available at low cost. Accordingly, the present invention utilizes $FeS_2$ as the positive electrode material. In this manner, an aluminum secondary cell can be fabricated by using $FeS_2$ as the positive electrode material and the non-aqueous electrolyte described in the foregoing. Particularly preferred are cubic $FeS_2$.

The aluminum non-aqueous electrolyte secondary cell according to the present invention employs a negative electrode made of aluminum or an aluminum alloy. More specifically, preferred aluminum alloys include those specified alloys No. 1100 (containing 1.0% in total of iron and silicon, from 0.05 to 0.2% of copper, 0.05% of manganese, 0.1% of zinc, and aluminum), No. 3003 (containing 0.6% of silicon, 0.7% of iron, from 0.05 to 0.2% of copper, from 1.0 to 1.5% of manganese, 0.1% of zinc, and aluminum), No. 5052 (containing 0.3% of silicon, 0.7% of iron, 0.2% of copper, 0.1% of manganese, from 2.2 to 2.8% of magnesium, 0.1% of chromium, 0.25% of zinc, and aluminum), and No. 6963 (containing from 0.2 to 0.6% of silicon, 0.35% of iron, 0.1% of copper, 0.1% of manganese, from 0.45 to 0.9% of magnesium, 0.1% of chromium, 0.1% of zinc, 0.1% of titanium, and aluminum), as well as those known as Al—Mg alloy (containing from 97 to 99% aluminum), and the JIS standard alloys.

In addition to the principal constitution concerning the negative electrode, the positive electrode material, and the non-aqueous electrolyte described above for the aluminum non-aqueous electrolyte secondary cell, other components such as separators, cell casings, collectors, etc., can be selected appropriately as desired.

As described in the foregoing, the aluminum non-aqueous electrolyte secondary cell according to the present invention is characterized in that the non-aqueous electrolyte comprises a non-aqueous solvent dissolved therein an aluminum halide, and an organic halide which is capable of functioning as a donor of anions, e.g., halogen ions. Accordingly, a cell having excellent charge–discharge characteristics can be implemented because $Al_2Y_7^-$ ions can be obtained preferentially in the non-aqueous electrolyte, and because a particular compound $FeS_2$ is used as the activating material for the positive electrode.

A preferred embodiment of according to the present invention is described in further detail below.

EXAMPLE

A mixture comprising 85% by weight of pyrite ($FeS_2$) as the activating material, 10% by weight of graphite as the electrically conductive material, and 5% by weight of pulverized polytetrafluoroethylene as the binder was shaped under pressure into a Mo current collector to obtain a positive electrode. The pyrite as used herein was dried previously at 100° C. Separately, a 100 µm thick aluminum sheet (99.99% pure aluminum) was prepared for use as the negative electrode. A non-aqueous electrolyte was prepared by dissolving anhydrous aluminum bromide and trimethylbenzyl chloride into a dehydrated 1,2-dichlorobenzene at a concentration of 7.5 mol/l and 2.5 mol/l, respectively. The positive electrode, the negative electrode, and the non-aqueous electrolyte thus obtained were assembled into an aluminum non-aqueous electrolyte secondary cell as illustrated in FIG. 1. Referring to FIG. 1, the resulting cell comprises a positive electrode 2 opposed to a negative electrode 4 with a gasket 5 incorporated therebetween. A positive terminal 1 and a negative terminal 3 are connected to the positive electrode 2 and the negative electrode 4, respectively. The both electrodes are separated by a polytetrafluoroethylene separator 6 interposed therebetween, and a non-aqueous electrolyte 7 is infused into the space provided between the two electrodes.

Figure 2:
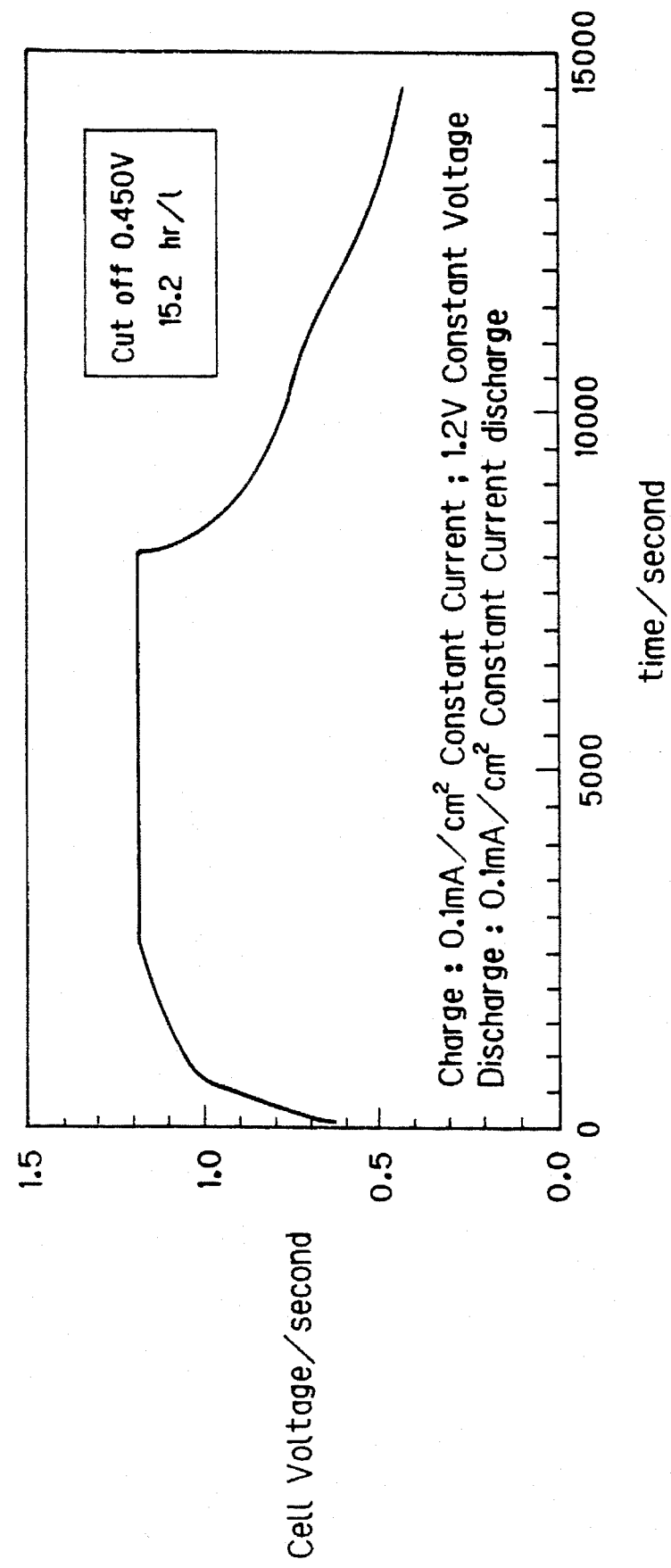
FIG. 2 is a graph showing the charge–discharge performance of an aluminum non-aqueous electrolyte secondary cell fabricated according to an embodiment of the present invention.

The resulting aluminum non-aqueous electrolyte secondary cell was subjected to a constant current discharge at a current density of 0.1 mA/cm$^2$ until a cell voltage of 0.45 V was achieved. The cell was then charged at a current density of 0.1 mA/cm$^2$ until a cell voltage of 1.2 V was attained. Then, the operation mode was switched to a 1.2-V constant voltage charging, and this was continued for 5,000 seconds. The charge–discharge characteristic curve thus obtained is given in FIG. 2.

Figure 3:
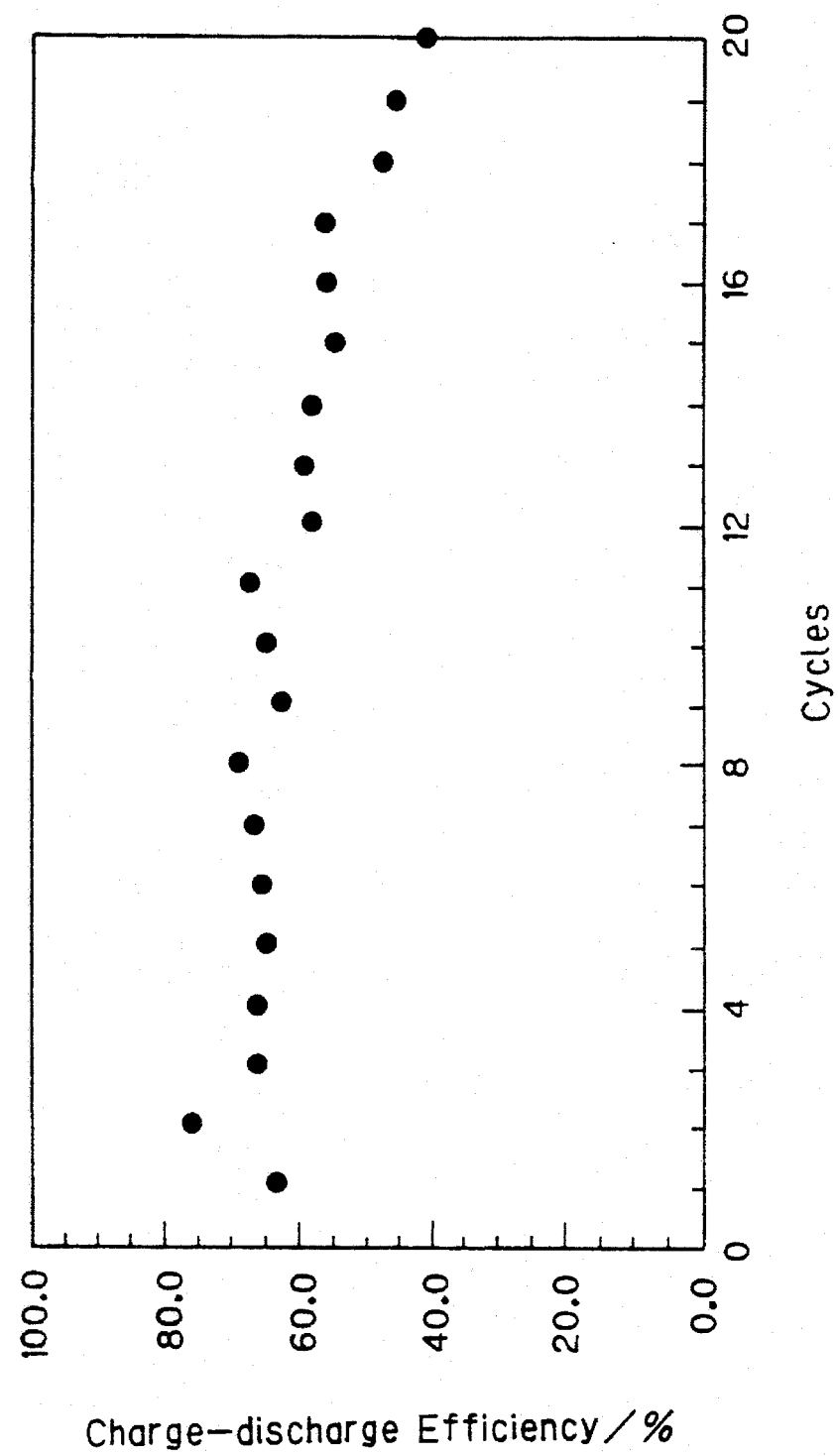
FIG. 3 is a graph showing the cycling efficiency of an aluminum non-aqueous electrolyte secondary cell fabricated according to an embodiment of the present invention.

The charge–discharge cycle was repeated to study the change of the charge–discharge efficiency (the ratio of the charge capacity to the discharge capacity) with the repetition of the cycle. The results are shown in FIG. 3. It can be seen that repeated charge and discharge cycle with a charge–discharge efficiency of 60% or higher is obtained for at least about 15 cycles.

As described in the foregoing, the present invention provides a rechargeable aluminum non-aqueous electrolyte secondary cell using aluminum or an aluminum alloy as the negative electrode. Because aluminum or an aluminum alloy has a high energy density, a superior secondary cell can be realized.

While the invention has been described in detail and with reference to specific embodiments thereof, it will be apparent to one skilled in the art that various changes and modifications can be made therein without departing from the spirit and scope thereof.

What is claimed is:

1. An aluminum non-aqueous electrolyte secondary cell comprising:

a negative electrode comprising aluminum or an aluminum alloy;

a positive electrode comprising $FeS_2$; and a non-aqueous electrolyte comprising an aluminum halide of the formula $AlX_3$, wherein X is selected from Cl, Br and I, said aluminum halide being present in said non-aqueous electrolyte in a concentration of from 0.1 to 10.0M, an organic halide selected from compounds having the formulas:

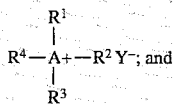

and

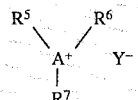

wherein A represents a nitrogen atom or phosphorus atom, $R^1$, $R^2$, $R^3$, $R^4$, $R^5$, $R^6$ and $R^7$ independently represent a hydrocarbon group, $R^1$ may be combined with $R^2$ to form a ring, $R^5$ may be combined with $R^7$ to form a ring, and $Y^-$ represents a counteranion selected from the group consisting of $Cl^-$, $Br^-$ and $I^-$, wherein X and Y are different, and a non-aqueous solvent selected from the group consisting of 1,2-dichloroethane, 1,2-dichlorobenzene, 1,3-dichlorobenzene and mixtures of at least two of the foregoing, the molar ratio of said organic halide to said aluminum halide in the non-aqueous electrolyte being from 0.2 to 1.0.

2. An aluminum non-aqueous electrolyte secondary cell as defined in claim 1, wherein said non-aqueous electrolyte consists essentially of said aluminum halide, said organic halide and said non-aqueous solvent.

* * * * *